United States Patent
Sano et al.

(10) Patent No.: US 10,485,014 B2
(45) Date of Patent: Nov. 19, 2019

(54) COMMUNICATION CONTROL DEVICE, COMMUNICATION CONTROL SYSTEM, AND COMMUNICATION CONTROL METHOD

(71) Applicant: FUJITSU LIMITED, Kawasaki-shi, Kanagawa (JP)

(72) Inventors: Takeshi Sano, Hino (JP); Takeshi Ohtani, Kawasaki (JP); Jun Kakuta, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/926,871

(22) Filed: Mar. 20, 2018

(65) Prior Publication Data

US 2018/0288786 A1    Oct. 4, 2018

(30) Foreign Application Priority Data

Mar. 31, 2017    (JP) ................. 2017-071403

(51) Int. Cl.
| | |
|---|---|
| *H04W 72/12* | (2009.01) |
| *H04W 4/80* | (2018.01) |
| *H04Q 9/00* | (2006.01) |
| *H04W 4/38* | (2018.01) |
| *H04W 4/70* | (2018.01) |
| *H04W 88/16* | (2009.01) |

(52) U.S. Cl.
CPC .......... *H04W 72/1247* (2013.01); *H04Q 9/00* (2013.01); *H04W 4/38* (2018.02); *H04W 4/70* (2018.02); *H04W 4/80* (2018.02); *H04W 72/121* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 6,556,822 B1 * | 4/2003 | Matsumoto | H04W 36/30 455/421 |
| 10,172,180 B1 * | 1/2019 | Huang | H04L 43/12 |
| 2005/0141451 A1 | 6/2005 | Yoon et al. | |
| 2006/0229014 A1 | 10/2006 | Harada et al. | |
| 2008/0293429 A1 | 11/2008 | Harris et al. | |

(Continued)

FOREIGN PATENT DOCUMENTS

| | | |
|---|---|---|
| JP | 2005-198305 A | 7/2005 |
| JP | 2006-520550 A | 9/2006 |

(Continued)

*Primary Examiner* — Candal Elpenord
(74) *Attorney, Agent, or Firm* — Arent Fox LLP

(57) ABSTRACT

A data acquisition unit repeatedly acquires pieces of notification information for executing predetermined processing from respective BLE devices. A connection controller detects a BLE device, calculates digitalized values of influences of the respective pieces of notification information acquired from the respective BLE devices on the predetermined processing on the basis of the pieces of notification information already acquired by the data acquisition unit, selects a BLE device on the basis of the calculated digitalized values of the influences, and causes the data acquisition unit to stop acquisition of the notification information from the selected BLE device and establishes connection with the BLE device.

6 Claims, 11 Drawing Sheets

(56) References Cited

U.S. PATENT DOCUMENTS

| | | | | |
|---|---|---|---|---|
| 2010/0330943 A1* | 12/2010 | Hoepfner | ............ | H04B 17/318 |
| | | | | 455/226.2 |
| 2015/0071228 A1* | 3/2015 | Quan | .................... | H04W 28/02 |
| | | | | 370/329 |
| 2016/0150357 A1* | 5/2016 | Jung | ................. | H04W 52/0206 |
| | | | | 455/41.1 |

FOREIGN PATENT DOCUMENTS

| | | |
|---|---|---|
| JP | 2006-319946 A | 11/2006 |
| JP | 2013-211815 A | 10/2013 |
| WO | WO 2004/084004 A2 | 9/2004 |

* cited by examiner

| DEVICE ID | NOTIFICATION INFORMATION | ACQUISITION TIME |
|---|---|---|
| AAA | vvvv | VV:VV:VV |
| BBB | wwww | WW:WW:WW |
| CCC | xxxx | XX:XX:XX |
| AAA | yyyy | YY:YY:YY |
| ⋮ | ⋮ | ⋮ |

| DEVICE ID | RADIO WAVE INTENSITY |
|---|---|
| AAA | aaaa |
| BBB | bbbb |
| CCC | cccc |
| ⋮ | ⋮ |

| DEVICE ID | DETERMINATION CONDITION | DATA COLLECTION IN PROGRESS | DATA ACQUISITION CYCLE |
|---|---|---|---|
| AAA | TEMPERATURE>40 °C | ○ | T1 |
| BBB | TEMPERATURE<20 °C | ○ | T2 |
| CCC | TEMPERATURE>35 °C | ○ | T3 |
| DDD | LUMINANCE>10 LX | - | T4 |
| ⋮ | ⋮ | ⋮ | ⋮ |

| DEVICE ID | NECESSITY |
|---|---|
| AAA | 0.7 |
| BBB | 0.9 |
| CCC | 0.3 |
| ⋮ | ⋮ |

COMMUNICATION CONTROL DEVICE, COMMUNICATION CONTROL SYSTEM, AND COMMUNICATION CONTROL METHOD

CROSS-REFERENCE TO RELATED APPLICATION

This application is based upon and claims the benefit of priority of the prior Japanese Patent Application No. 2017-071403, filed on Mar. 31, 2017, the entire contents of which are incorporated herein by reference.

FIELD

The embodiments discussed herein are related to a communication control device, a communication control system, and a communication control method.

BACKGROUND

In recent years, Internet of Things (IoT) solutions that collect pieces of data from a large number of devices such as sensors and apparatuses collecting predetermined information and utilize them for service have spread. Examples of the IoT solutions include solutions for improving productivity and quality in factories and solutions for efficiently using energy.

Bluetooth (registered trademark) low energy (BLE) devices have recently increased as devices that are used in IoT. The BLE is a short-range radio communication standard and a configuration in which pieces of notification information as pieces of data transmitted from the BLE devices are connected to a center server through a gate way (GW) device arranged in the range where radio waves reach is used in many cases. There are two methods for acquiring the pieces of data from the BLE devices by the GW device. Both of the methods use scanning processing with which the GW device detects the BLE devices and advertise messages with which the BLE devices notify of their own presences.

With the one data acquisition method, when the GW device receives the advertise message output from the BLE device during execution of the scanning, the GW device transmits and receives data to and from the BLE device as an output source of the advertise message and acquires notification information. Hereinafter, the BLE device that transmits the notification information using this data acquisition method is referred to as a "beacon-type" BLE device. The beacon-type BLE device includes a type of device that incorporates the notification information into the advertise message and transmits it to the GW device.

With the other data acquisition method, when the GW device receives the advertise message output from the BLE device during execution of the scanning, the GW device performs connection processing with the BLE device as an output source of the advertise message. Then, the GW device transmits and receives data to and from the BLE device with which the connection processing has been completed to establish connection and acquires the notification information. When the GW device acquires the notification information from the BLE device with which connection has already been established, it acquires the notification information without performing the scanning, the reception of the advertise message, and the connection processing. Hereinafter, the BLE device that transmits the notification information using this data acquisition method is referred to as a "connection-type" BLE device.

When the GW device performs the scanning and data transmission and reception during execution of the connection processing with the connection-type BLE device, the connection processing is finished and connection with the BLE device is not established. For this reason, the GW device detects no BLE device through the scanning and acquires no notification information from other BLE devices during the connection processing. In the case in which there are the BLE devices subordinate to one GW device, the GW device does not acquire the pieces of notification information that are transmitted from the other BLE devices during the connection processing when performing the connection processing with the connection-type BLE device. Missing of the notification information therefore occurs and service quality of service involving provision of the pieces of notification information of the BLE devices is deteriorated.

Several methods can be considered in order to avoid the deterioration in the service. For example, a method in which the GW device has a plurality of interfaces can be considered. This method enables the GW device to perform the connection processing and the detection of the BLE devices by the scanning and acquisition of the pieces of notification information from the other BLE devices in parallel. In addition, there is, for example, a method in which reception intervals of the pieces of notification information from the other BLE devices are monitored and the connection processing is executed in a time band during which data transmission and reception are not performed.

Furthermore, there is a conventional communication control technique in which connection with a plurality of terminals is performed while lowering the priority of connection with a terminal under a bad radio wave environment. There is also a conventional technique in which data transfer capable of being delayed is delayed in congestion. Moreover, a conventional technique in which assignment of channel time is changed depending on types of services that pieces of transmission and reception data provide has been known. A conventional technique in which connection with apparatuses making short-range wireless communication is performed in the order of priority by adding the priorities to the apparatuses has been also known.

Conventional techniques are described, for example, in Japanese Laid-open Patent Publication No. 2013-211815, Japanese National Publication of International Patent Application No. 2006-520550, Japanese Laid-open Patent Publication No. 2005-198305, and Japanese Laid-open Patent Publication No. 2006-319946 are examples of the conventional techniques.

With the method in which the interfaces are mounted in the GW device, it is difficult to add a communication interface because cost for introduction and operation is increased although addition of the communication interface is considered to be requested after operation. That is to say, it is difficult to prevent addition of the connection-type BLE device from influencing acquisition of the pieces of notification information of the other BLE devices and there is the risk that service quality is reduced. Furthermore, the method in which the connection processing is executed in the time band during which the data transmission and reception are not performed by the other devices has the risk that spare time becomes short and the connection is not completed when many BLE devices are present. In addition, when it takes a long time for the connection using spare time due to a worse radio wave status, acquisition failure of the notification information of another BLE device occurs.

Even with the conventional technique in which the connection with the terminals is performed while lowering the priority of connection with the terminal under the bad radio wave environment, it is difficult to reduce influences by the connection of the connection-type BLE device on information acquisition of the other BLE devices and there is the risk that the service quality is reduced. The same holds true for the usage of the conventional technique in which the data transfer capable of being delayed is delayed in congestion, the conventional technique in which the assignment of the channel time is changed depending on the types of services, and the conventional technique in which the connection is performed in the order of priority.

SUMMARY

According to an aspect of an embodiment, a communication control device includes: a data acquisition unit that repeatedly acquires pieces of notification information for executing predetermined processing from a plurality of terminal devices; and a connection controller that detects a specific connectible terminal device, calculates digitalized values of influences of the respective pieces of notification information acquired from the respective terminal devices on the predetermined processing on the basis of the pieces of notification information already acquired by the data acquisition unit, selects a terminal device on the basis of the calculated digitalized values of the influences, and causes the data acquisition unit to stand by for acquisition of the notification information from the selected terminal device and establishes connection with the specific terminal device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a notification information table;

FIG. 4 is a diagram illustrating an example of a radio wave intensity table;

FIG. 5 is a diagram illustrating an example of a device table;

FIG. 6 is a diagram illustrating an example of a necessity table;

DESCRIPTION OF EMBODIMENTS

Preferred embodiments of the present invention will be explained with reference to accompanying drawings. The communication control device, the communication control system, the communication control method, and the communication control program that are disclosed in the present application are not limited by the following embodiments.

[a] First Embodiment

Figure 1:
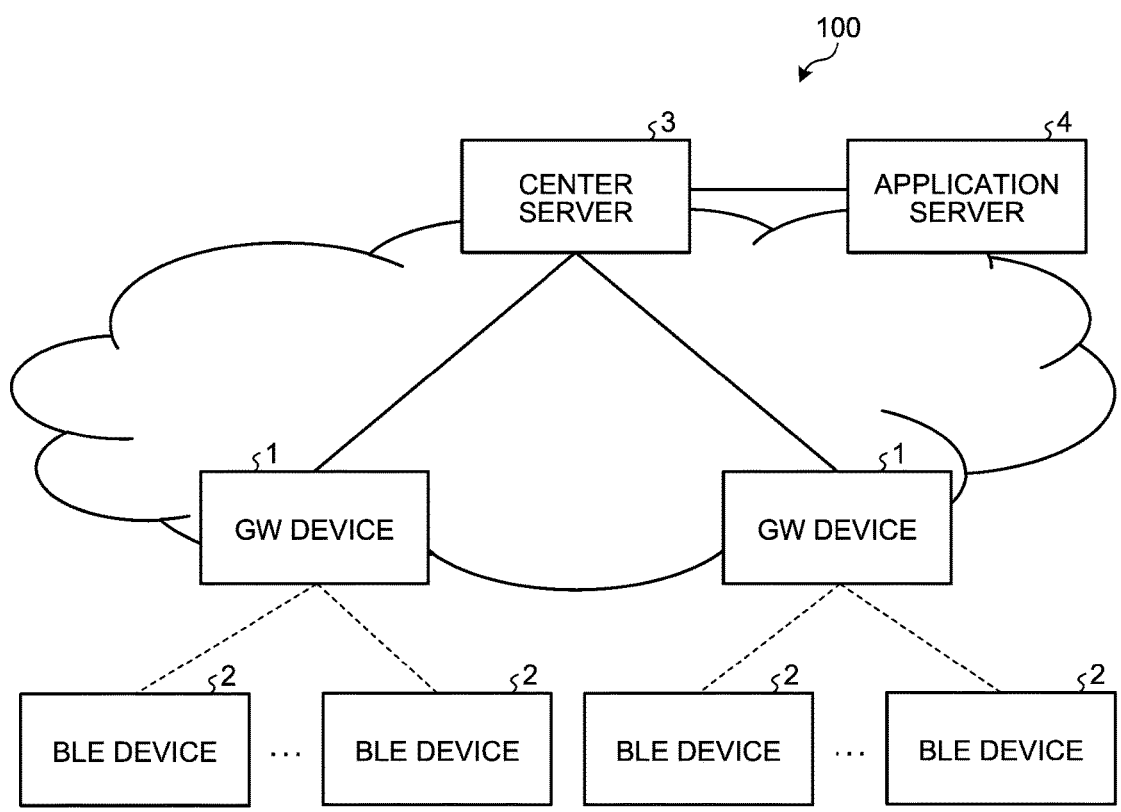
FIG. 1 is a diagram illustrating the system configuration of an information collection system.

FIG. 1 is a diagram illustrating the system configuration of an information collection system. As illustrated in FIG. 1, an information collection system 100 in the embodiment includes GW devices 1, BLE devices 2, a center server 3, and an application server 4. The information collection system 100 is an example of a "communication control system".

The application server 4 transmits, to the center server 3, a transmission request of notification information notified from the BLE device 2. Thereafter, the application server 4 acquires the specified notification information from the center server 3. The application server 4 performs predetermined processing using the collected notification information. The application server 4 is an example of a "processing execution device".

In the embodiment, the application server 4 has, for the respective BLE devices 2, abnormal values for detecting occurrence of abnormalities with the pieces of notification information notified from the BLE devices 2. The application server 4 transmits, to the center server 3, determination conditions for determining the abnormalities using the abnormal values.

The center server 3 is connected to one or the plurality of GW devices 1. The center server 3 receives the pieces of notification information collected from the BLE devices 2 from the GW device 1 connected thereto. The center server 3 accumulates therein the pieces of received notification information. After that, when the center server 3 receives the transmission request from the application server 4, it extracts specified data from the pieces of accumulated notification information and transmits it to the application server 4.

The center server 3 receives the determination conditions of the respective BLE devices 2 from the application server 4. The center server 3 transmits the received determination conditions of the respective BLE devices 2 to the GW device 1 to which the respective BLE devices 2 are connected.

Although FIG. 1 illustrates the center server 3 and the application server 4 as different servers, in practice, one apparatus may have functions of the center server 3 and the application server 4.

The BLE devices 2 are connected to the GW device 1. Hereinafter, the BLE devices 2 connected to the GW device 1 are referred to as the BLE devices 2 subordinate to the GW device 1. A large number of BLE devices 2 are arranged and the number of them exceeds the number of manageable devices by the GW device 1 in many cases. In order to cope with such a case and reduce load on one GW device 1, the GW devices 1 are arranged for one center server 3 in many cases.

The GW device 1 executes scanning and receives advertise messages from the subordinate BLE devices 2 with constant time intervals. When the BLE device 2 is a beacon-type device, the GW device 1 transmits a data transmission request to the BLE device 2 as a transmission source of the advertise message. Thereafter, the GW device 1 receives, as a response to the transmission request, the notification information from the BLE device 2 as the transmission destination of the data transmission request. The GW device 1 is an example of a "communication control device".

When the BLE device 2 is a connection-type device, the GW device 1 executes connection processing with the BLE device 2 as a transmission source of the advertise message to establish connection therewith. After the establishment of the connection, the GW device 1 transmits a data transmission request to the BLE device 2 with which the connection has been established with a constant time interval. Thereafter, the GW device 1 receives, as a response to the transmission request, the notification information from the BLE device 2 as the transmission destination of the data transmission request. The connection processing will be described in detail later.

Each BLE device 2 acquires predetermined information. The BLE device 2 acquires, for example, information about the temperature of an installed place and information about humidity thereof. The BLE device 2 transmits the acquired information as the notification information to the GW device 1. The BLE device 2 is an example of a "terminal device".

Figure 2:
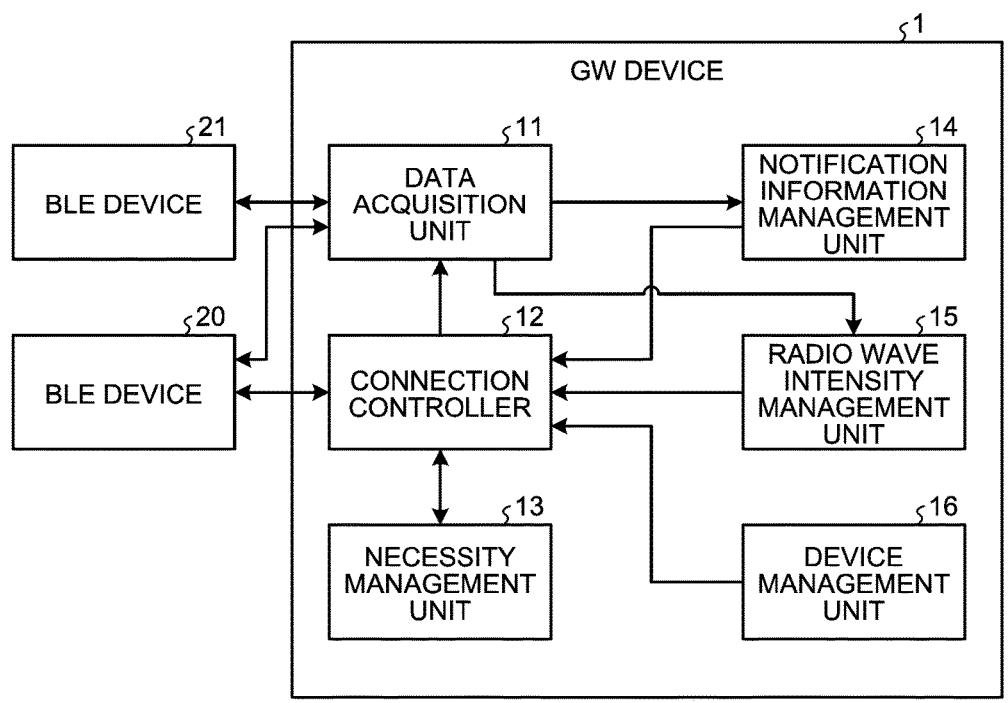
FIG. 2 is a block diagram of a GW device.

Next, the connection processing of the connection-type BLE device 2 by the GW device 1 will be described with reference to FIG. 2. FIG. 2 is a block diagram of the GW device. Each BLE device 21 is a BLE device 2 that has ever transmitted notification information to the GW device 1. The BLE device 21 may be a connection-type or beacon-type BLE device. When the BLE device 21 is the connection-type BLE device, the BLE device 2 is in a connected state with the GW device 1. There are a plurality of BLE devices 21. Hereinafter, the BLE device 2 from which the GW device 1 continuously receives the notification information is referred to as a data collection device in some cases. A BLE device 20 is the connection-type BLE device 2 with which the connection processing is to be performed. Hereinafter, the connection-type BLE device 2 with which the connection processing is to be performed is referred to as a BLE device to be connected.

As illustrated in FIG. 2, the GW device 1 includes a data acquisition unit 11, a connection controller 12, a necessity management unit 13, a notification information management unit 14, a radio wave intensity management unit 15, and a device management unit 16.

The data acquisition unit 11 makes data transmission request and so on and receives the notification information from each BLE device 21. The data acquisition unit 11 outputs the received notification information and the acquisition time to the notification information management unit 14. The data acquisition unit 11 acquires a connection status with the BLE device 21 that includes a radio wave intensity using received packets containing the notification information in the reception of the packets. The data acquisition unit 11 outputs the radio wave intensity to the radio wave intensity management unit 15. The connection status that includes the radio wave intensity is an example of a "communication state".

The data acquisition unit 11 receives notification of connection completion of the BLE device 20 from the connection controller 12. Thereafter, the data acquisition unit 11 starts reception of the notification information from the BLE device 20 and outputs the received notification information from the BLE device 20 to the notification information management unit 14. The data acquisition unit 11 outputs the radio wave intensity with the BLE device 20 to the radio wave intensity management unit 15.

The notification information management unit 14 includes a storage device. The notification information management unit 14 has a notification information table 141 as illustrated in FIG. 3 in its own storage device. FIG. 3 is a diagram illustrating an example of the notification information table.

The notification information management unit 14 receives, from the data acquisition unit 11, input of the notification information and the acquisition time together with identification information of the BLE device 21 as a transmission source. In this example, the notification information management unit 14 acquires a device identifier (ID) as the identification information of the BLE device 21. The notification information management unit 14 registers, in the notification information table 141, the acquired notification information and acquisition time while making them correspond to the device ID. The notification information management unit 14 transmits, to the center server 3, the identification information and the notification information of the BLE device 21 as the transmission source.

The radio wave intensity management unit 15 includes a storage device. The radio wave intensity management unit 15 has a radio wave intensity table 151 as illustrated in FIG. 4 in its own storage device. FIG. 4 is a diagram illustrating an example of the radio wave intensity table.

The radio wave intensity management unit 15 receives, from the data acquisition unit 11, input of the radio wave intensity together with the identification information of the BLE device 21 as the transmission source of the packets from which the radio wave intensity has been acquired. The radio wave intensity management unit 15 also acquires the device ID as the identification information of the BLE device 21. The radio wave intensity management unit 15 registers, in the radio wave intensity table 151, the acquired radio wave intensity while making it correspond to the device ID.

The device management unit 16 includes a storage device. The device management unit 16 has a device table 161 in which the BLE devices 21 are registered in its own storage device. FIG. 5 is a diagram illustrating an example of the device table.

The device management unit 16 receives the determination conditions of the BLE devices 21 from the center server 3. The device management unit 16 registers, in the device table 161, the received determination conditions while making them correspond to the BLE devices 21. The determination condition has the abnormal value as a threshold for determining an abnormal state and a condition for determination using the abnormal value. For example, in the case of the determination condition that the temperature is higher than 40° C. in FIG. 5, the abnormal value is 40° C.

After connection with the BLE device 20 is established, the device management unit 16 acquires the device ID as the identification information of the BLE device 20 and a data acquisition cycle thereof from the connection controller 12. Then, the device management unit 16 adds an entry of the BLE device 20 to the device table 161. Thereafter, the device management unit 16 registers, in the device table 161, the determination conditions of the BLE devices 21 that have been received from the center server 3.

The device management unit 16 further acquires, from the data acquisition unit 11, pieces of information of the BLE devices 2 including the BLE devices 21 as data acquisition sources. The device management unit 16 adds, to the device table 161, information indicating whether data is being collected for each BLE device 2. In FIG. 5, the BLE devices 2 with circles in the item of "data collection in progress" are, for example, the BLE devices 2 as notification information reception targets. The BLE device 2 with no circle in the item of "data collection in progress" is the BLE device 2 excluded from the notification information reception targets. The BLE device 2 excluded from the notification information reception targets is, for example, a BLE device 2 from which notification information was being received but for which it has become difficult to acquire notification information due to a worsened radio wave status. In the embodiment, the device table 161 keeps information of the BLE device 2 excluded from the notification information reception targets but the device management unit 16 may delete, from the device table 161, the information of the BLE device 2 excluded from the notification information reception targets.

The necessity management unit 13 includes a storage device. The necessity management unit 13 stores therein a necessity table 131 illustrated in FIG. 6 in its own storage device. FIG. 6 is a diagram illustrating an example of the necessity table. The necessity will be described in detail later.

The connection controller 12 receives the advertise message from the BLE device 20. The connection controller 12 detects, as the BLE device 20 to be connected, the BLE device 20 as the transmission source of the advertise message. Then, the connection controller 12 executes processing of determining timing at which the connection processing with the BLE device 20 to be connected will be performed. Hereinafter, the processing of determining the timing at which the connection processing with the BLE device 20 will be performed will be described in detail.

The connection controller 12 extracts the BLE devices 21 during the data collection from the device table 161 that the device management unit 16 has. Subsequently, the connection controller 12 selects one from the extracted BLE devices 21 during the data collection.

Then, the connection controller 12 acquires the pieces of notification information of the selected BLE device 21 up to the current time point from a time point, which was a specific period of time before the current time, from the notification information table 141 that the notification information management unit 14 has. For example, when the BLE device 21 transmits a measurement value as the notification information every 1 to 10 seconds, the connection controller 12 sets the constant period of time to 10 minutes or the like. The connection controller 12 calculates an average value and a dispersion value of the pieces of acquired notification information.

Subsequently, the connection controller 12 acquires the abnormal value of the selected BLE device 21 from the device table 161 that the device management unit 16 has. The connection controller 12 then calculates a difference between the calculated average value of the pieces of notification information and the acquired abnormal value.

Furthermore, the connection controller 12 acquires the radio wave intensity of the selected BLE device 21 from the radio wave intensity table 151 that the radio wave intensity management unit 15 has.

The connection controller 12 calculates the necessity of the selected BLE device 21 using the difference between the average value and the abnormal value, the dispersion value of the pieces of notification information, and the radio wave intensity in the following equation 1.

$$\text{Necessity} = \frac{1}{\text{difference}} \times \text{dispersion value} \times \frac{1}{\text{radio wave intensity}} \quad (1)$$

The necessity is decreased as the difference between the average value of the pieces of notification information and the abnormal value is larger. That is to say, the necessity is increased when the recent pieces of notification information are close to the abnormal value and the possibility that the abnormality occurs is high. The necessity is increased as variation is increased. That is to say, the necessity is increased when the variation is large, the notification information to be subsequently transmitted is incapable of being predicted, and the possibility that the abnormality occurs is high. The necessity is decreased as the radio wave intensity is higher. That is to say, the necessity is increased for the BLE device 2 for which the number of times of trying to acquire the notification information therefrom is preferably increased because the possibility that the notification information can be acquired is low due to a bad radio wave status. In other words, the necessity can be considered as a digitized value of the influence on the predetermined processing that the application server 4 executes.

The connection controller 12 outputs the calculated necessity to the necessity management unit 13. The connection controller 12 repeats the above-described necessity calculation processing to calculate the necessities of all of the BLE devices 21.

Then, the connection controller 12 sorts the pieces of information of the BLE devices 21 registered in the necessity table 131 that the necessity management unit 13 has in the descending order of the necessity. The connection controller 12 selects the BLE devices 21 in the decreasing order of the necessity from the pieces of sorted information in the necessity table 131.

The connection controller 12 previously stores therein a threshold of the necessity for determining whether next acquisition of the notification information of each BLE device 21 may be skipped. The connection controller 12 determines whether the necessity of the selected BLE device 21 is lower than the threshold. When the necessity of the selected BLE device 21 is equal to or higher than the threshold, the connection controller 12 shifts to determination of the subsequent BLE device 21.

On the other hand, when the necessity of the selected BLE device 21 is lower than the threshold, the connection controller 12 acquires the data acquisition cycle of the selected BLE device 21 from the device table 161 that the device management unit 16 has. The connection controller 12 calculates the next acquisition timing of the notification information of the selected BLE device 21. The next acquisition timing of the notification information is, for example, time from the current time point to the next acquisition of the notification information.

The connection controller 12 stores therein the calculated next acquisition timing of the notification information of the selected BLE device 21 and shifts to determination for the subsequent BLE device 21. The connection controller 12 repeats the determination in order to make the determination for all of the BLE devices 21 during the data collection. Thereafter, the connection controller 12 determines whether there is a BLE device 2 the necessity of which is lower than the threshold among the BLE devices 21.

When there are the BLE devices 2 the necessities of which are lower than the threshold, the connection controller 12 specifies the BLE device 21 with the closest next acquisition timing of the notification information among the BLE devices 21 the necessities of which are lower than the threshold. Then, the connection controller 12 determines that the connection processing with the BLE device 20 to be connected is executed at the next acquisition timing of the notification information of the specified BLE device 21.

When the necessities of the BLE devices 21 are equal to or higher than the threshold, the connection controller 12 specifies the BLE device 21 with the lowest necessity. Then, the connection controller 12 determines that the connection processing with the BLE device 20 to be connected is executed at the next acquisition timing of the notification information of the specified BLE device 21.

After that, when the next acquisition timing of the notification information of the specified BLE device 21 comes, the connection controller 12 executes the connection processing with the BLE device 20 to be connected. When the connection with the BLE device 20 to be connected is established, the connection controller 12 notifies the data acquisition unit 11 of the establishment of the connection and notifies the device management unit 16 of the identification information and the data acquisition cycle of the BLE device 20.

That is to say, when the abnormal value is set to each BLE device 21, the connection controller 12 executes the connection processing at the acquisition timing of the notification information of the BLE device 21 under the condition that the abnormality is difficult to occur although the closest timing is finally selected. In the embodiment, the connection controller 12 executes the connection processing preferentially at the acquisition timing of the notification information of the BLE device 21 with the high possibility that the notification information can be acquired therefrom.

The data acquisition unit 11 acquires no notification information from the BLE devices 21 while the connection controller 12 executes the connection processing. That is to say, the data acquisition unit 11 stands by for collection of the pieces of notification information of the BLE devices 23.

In the embodiment, the abnormal value is set to each BLE device 21 as an example. Alternatively, when no abnormal value is set, the connection controller 12 executes the connection processing at the acquisition timing of the notification information of the BLE device 21 for which the notification information to be subsequently transmitted can be predicted for the following reason. That is, when the notification information to be subsequently transmitted can be predicted to some extent, the processing that the application server 4 executes is less influenced even when the notification information is not acquired.

Figure 7:
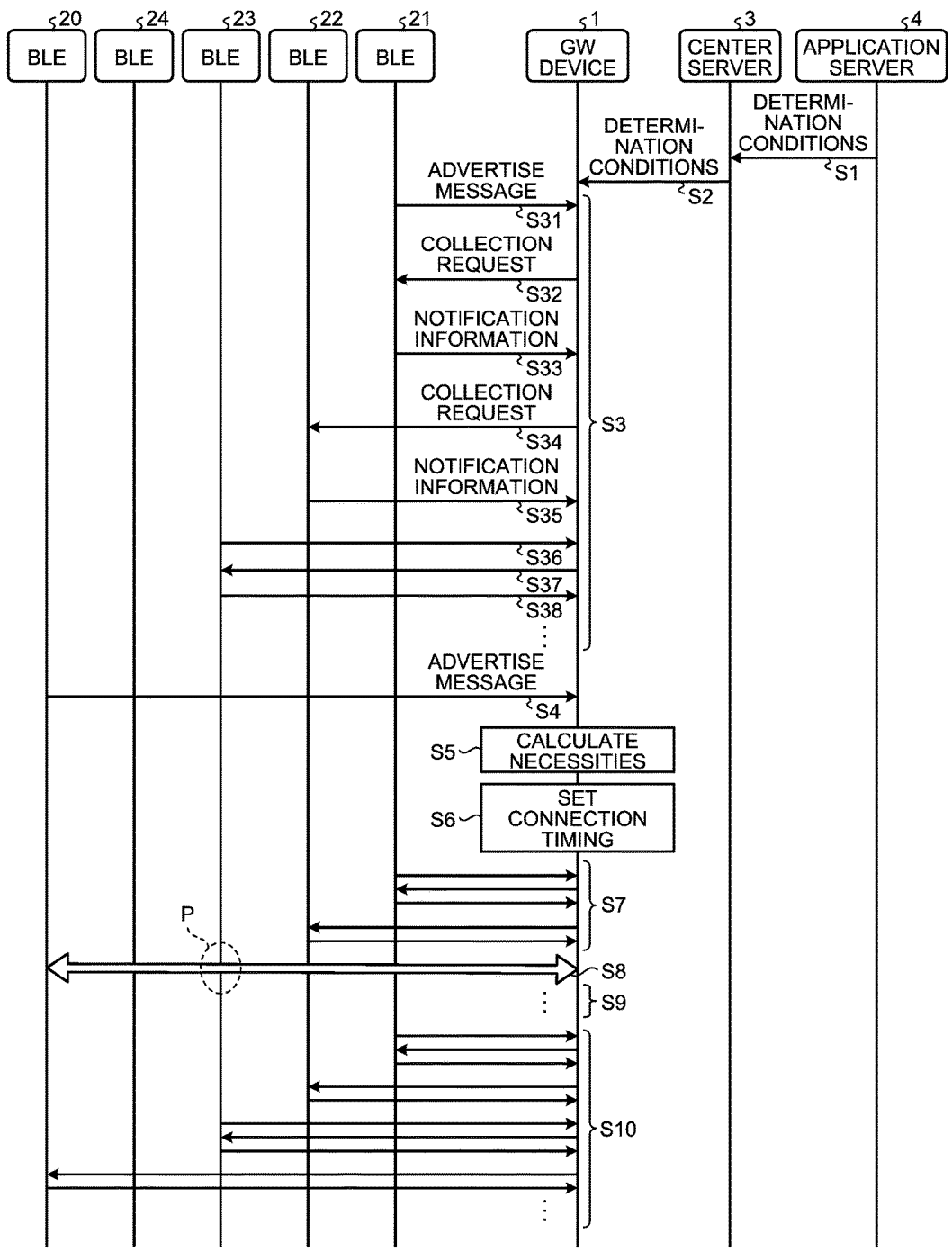
FIG. 7 is a sequence diagram of connection processing by a GW device according to a first embodiment.

Next, flow of the connection processing of the connection-type BLE device 2 by the GW device 1 in the embodiment will be described with reference to FIG. 7. FIG. 7 is a sequence diagram of the connection processing by the GW device in the first embodiment. In FIG. 7, the BLE devices 21 to 23 are the BLE devices 2 from which pieces of data are being acquired and the BLE device 24 is the BLE device 2 from which data has been acquired before but no data is being currently acquired. The BLE devices 21 and 23 are the beacon-type BLE devices 2 and the BLE device 22 is the connection-type BLE device 2. The BLE device 20 is the BLE device 2 to be connected. Although FIG. 7 illustrates the BLE devices 20 to 24, they are examples and there are other BLE devices 2 subordinate to the GW device 1.

The application server 4 transmits, to the center server 3, the determination conditions (step S1).

The center server 3 receives the determination conditions from the application server 4. The center server 3 then transmits the determination conditions to the GW device 1 (step S2).

The device management unit 16 of the GW device 1 receives the determination conditions from the center server 3. The device management unit 16 registers the determination conditions corresponding to the respective BLE devices 21 to 23 in the device table 161. Thereafter, the data acquisition unit 11 of the GW device 1 collects the pieces of notification information from the BLE devices 21 to 23 (step S3). Then, the notification information management unit 14 registers, in the notification information table 141, the pieces of notification information of the BLE devices 21 to 23 collected by the data acquisition unit 11.

Details of the acquisition processing of the pieces of notification information at step S3 will be described. The connection controller 12 receives the advertise message from the BLE device 21 (step S31). The connection controller 12 notifies the data acquisition unit 11 of the reception of the advertise message from the BLE device 21. When the data acquisition unit 11 is notified of the reception of the advertise message, it transmits a collection request to the BLE device 21 as the transmission source of the advertise message (step S32). The BLE device 21 transmits, as a response to the collection request, the notification information to the data acquisition unit 11 of the GW device 1 (step S33).

The data acquisition unit 11 transmits the collection request to the BLE device 22 in a state of being connected periodically (step S34). The BLE device 22 transmits, as a response to the collection request, the notification information to the data acquisition unit 11 of the GW device 1 (step S35).

The connection controller 12 receives the advertise message from the BLE device 23 (step S36). Thereafter, the data acquisition unit 11 transmits the collection request to the BLE device 23 (step S37). The BLE device 23 transmits, as a response to the collection request, the notification information to the data acquisition unit 11 of the GW device 1 (step S38). The GW device 1 also receives the pieces of notification information from the BLE devices 2 as the other data collection devices and completes step S3. The GW device 1 acquires no notification information from the BLE device 24 because the BLE device 24 is excluded from the notification information reception targets.

Thereafter, the connection controller 12 of the GW device 1 receives the advertise message from the BLE device 20 (step S4).

Then, the connection controller 12 of the GW device 1 calculates the necessities of the data collection devices including the BLE devices 21 to 23 (step S5).

The connection controller 12 of the GW device 1 determines the connection timing using the calculated necessities of the respective data collection devices (step S6). That is to say, the connection controller 12 determines the BLE device 2 with the collection timing of the notification information at which it executes the connection processing with the BLE device 20. In this example, the connection controller 12 determines that it executes the connection processing with the BLE device 20 at the collection timing of the notification information of the BLE device 23.

Thereafter, the data acquisition unit 11 of the GW device 1 executes the collection processing of the pieces of notification information from the BLE devices 21 and 22 (step S7).

The connection controller 12 of the GW device 1 executes the connection processing with the BLE device 20 at the collection timing of the notification information of the BLE device 23 (step S8). In this case, the data acquisition unit 11 of the GW device 1 acquires no notification information of the BLE device 23 at timing P. That is to say, the data acquisition unit 11 stands by for collection of the notification information of the BLE device 23 and skips the collection for one time at the timing P.

Thereafter, the data acquisition unit 11 of the GW device 1 executes the collection processing of the pieces of notification information from the other data collection devices (step S9). With these pieces of processing, the data acquisition unit 11 can acquire the pieces of notification information of all of the data collection devices other than the BLE device 23.

Thereafter, the data acquisition unit 11 of the GW device 1 executes the collection processing of the pieces of notification information from the data collection devices including the BLE devices 20 to 23 because connection with the BLE device 20 has been established (step S10).

Figure 8:
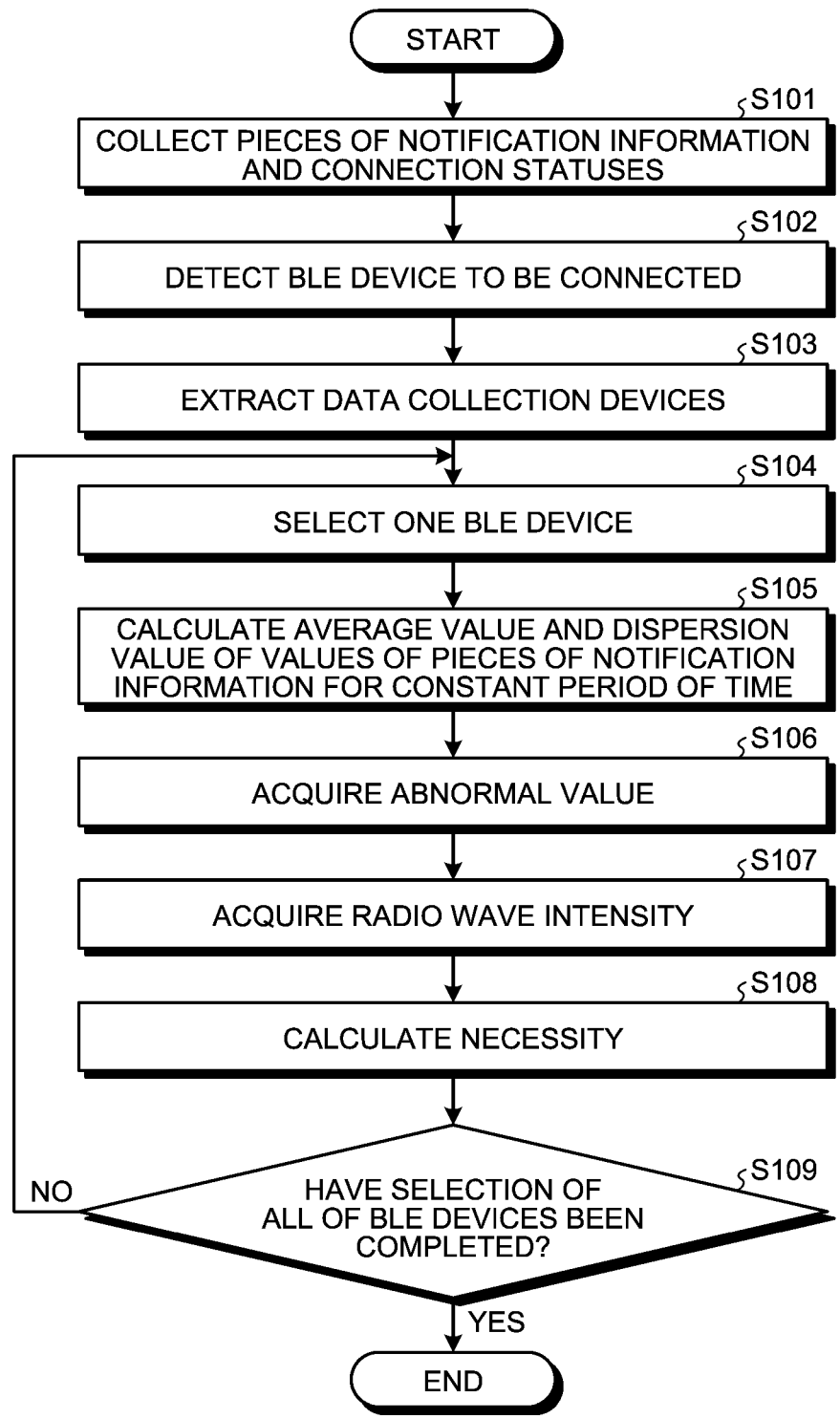
FIG. 8 is a flowchart of necessity calculation processing.

Next, flow of the necessity calculation processing by the GW device 1 in the embodiment will be described with reference to FIG. 8. FIG. 8 is a flowchart of the necessity calculation unit processing. The processing illustrated in the flowchart in FIG. 8 is an example of the processing that is executed at step S5 in FIG. 7.

The data acquisition unit 11 collects the pieces of notification information from the BLE devices 2 as the data collection devices. The data acquisition unit 11 measures and collects the connection statuses such as the radio wave intensities of the respective BLE devices 2 using the packets used for transmission of the pieces of notification information (step S101). The data acquisition unit 11 then transmits the pieces of notification information of the respective data collection devices to the notification information management unit 14. The notification information management unit 14 registers, in the notification information table 141, the pieces of notification information of the respective data collection devices. The data acquisition unit 11 transmits the radio wave intensities of the respective BLE devices 2 to the radio wave intensity management unit 15. The radio wave intensity management unit 15 registers, in the radio wave intensity table 151, the radio wave intensities of the respective BLE devices 2.

The connection controller 12 receives the advertise message to detect the BLE device 2 to be connected (step S102).

Subsequently, the connection controller 12 extracts the BLE devices 2 as the data collection devices from the device table 161 that the device management unit 16 has (step S103).

The connection controller 12 selects one BLE device 2 from the extracted BLE devices 2 (step S104).

Then, the connection controller 12 acquires the pieces of notification information of the selected BLE device 2 for the constant period of time from the notification information table 141 that the notification information management unit 14 has. The connection controller 12 calculates the average value and the dispersion value of the pieces of notification information of the selected BLE device 2 (step S105).

Subsequently, the connection controller 12 acquires the abnormal value set to the selected BLE device 2 from the device table 161 that the device management unit 16 has (step S106). The connection controller 12 calculates the difference between the average value of the pieces of notification information of the selected BLE device 2 and the abnormal value thereof.

The connection controller 12 acquires the radio wave intensity of the selected BLE device 2 from the radio wave intensity table 151 that the radio wave intensity management unit 15 has (step S107).

The connection controller 12 calculates the necessity of the selected BLE device 2 using the difference between the average value of the pieces of notification information of the selected BLE device 2 and the abnormal value thereof, the dispersion value of the pieces of notification information, and the radio wave intensity for the equation 1 (step S108). After that, the connection controller 12 outputs the calculated necessity to the necessity management unit 13. The necessity management unit 13 registers, in the necessity table 131, the necessity while making it correspond to the selected BLE device 2.

After that, the connection controller 12 determines whether selection of all of the extracted BLE devices 2 has been completed (step S109). When the BLE device 2 that has not been selected remains (No at step S109), the connection controller 12 returns the process to step S104.

On the other hand, when selection of all of the extracted BLE devices 2 has been completed (Yes at step S109), the connection controller 12 finishes the necessity calculation processing.

Figure 9:
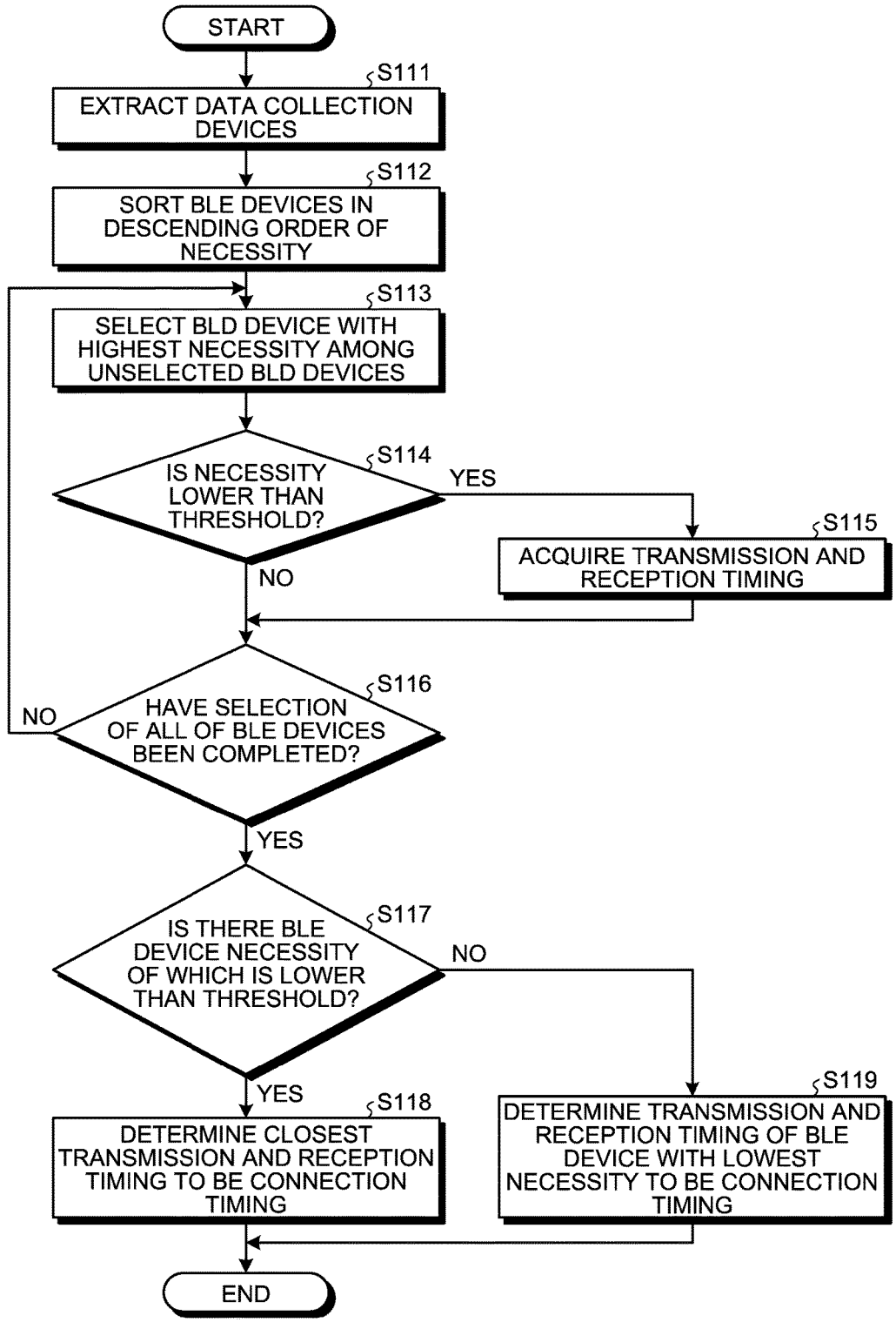
FIG. 9 is a flowchart of connection timing determination processing.

Next, flow of the connection timing determination processing by the GW device 1 in the embodiment will be described with reference to FIG. 9. FIG. 9 is a flowchart of the connection timing determination processing. The processing illustrated in the flowchart in FIG. 9 is an example of the processing that is executed at step S6 in FIG. 7.

The connection controller 12 extracts the BLE devices 2 as the data collection devices from the device table 161 that the device management unit 16 has (step S111). The connection controller 12 may use the extraction result of the data collection devices in the necessity calculation processing illustrated in FIG. 8.

Then, the connection controller 12 sorts the extracted BLE devices 2 in the descending order of the necessity using the necessity table 131 that the necessity management unit 13 has (step S112).

The connection controller 12 selects the BLE devices 2 in the order from the head of the sorted BLE devices 2 to select the BLE device 2 with the highest necessity from the unselected BLE devices 2 (step S113).

Then, the connection controller 12 determines whether the necessity of the selected BLE device 2 is lower than the threshold (step S114). When the necessity of the selected BLE device 2 is equal to or higher than the threshold (No at step S114), the connection controller 12 proceeds the process to step S116.

On the other hand, when the necessity of the selected BLE device 2 is lower than the threshold (Yes at step S114), the connection controller 12 acquires the data acquisition cycle of the selected BLE device 2 registered in the device table 161 that the device management unit 16 has. Then, the connection controller 12 acquires next transmission and reception timing of the notification information of the selected BLE device 2 using the data acquisition cycle (step S115).

Thereafter, the connection controller 12 determines whether selection of all of the extracted BLE devices 2 has been completed (step S116). When a BLE device 2 that has not been selected is remaining (No at step S116), the connection controller 12 returns the process to step S113.

On the other hand, when selection of all of the extracted BLE devices 2 has been completed (Yes at step S116), the connection controller 12 determines whether there is a BLE device 2 the necessity of which is lower than the threshold among the extracted BLE devices 2 (step S117).

When there is a BLE device 2 the necessity of which is lower than the threshold (Yes at step S117), the connection controller 12 determines the closest transmission and reception timing of the notification information to be the connection timing of the BLE device 2 to be connected (step S118).

When there is no BLE device 2 the necessity of which is lower than the threshold (No at step S117), the connection controller 12 determines the transmission timing of the notification information of the BLE device 2 with the lowest necessity to be the connection timing of the BLE device 2 to be connected (step S119).

Figure 10:
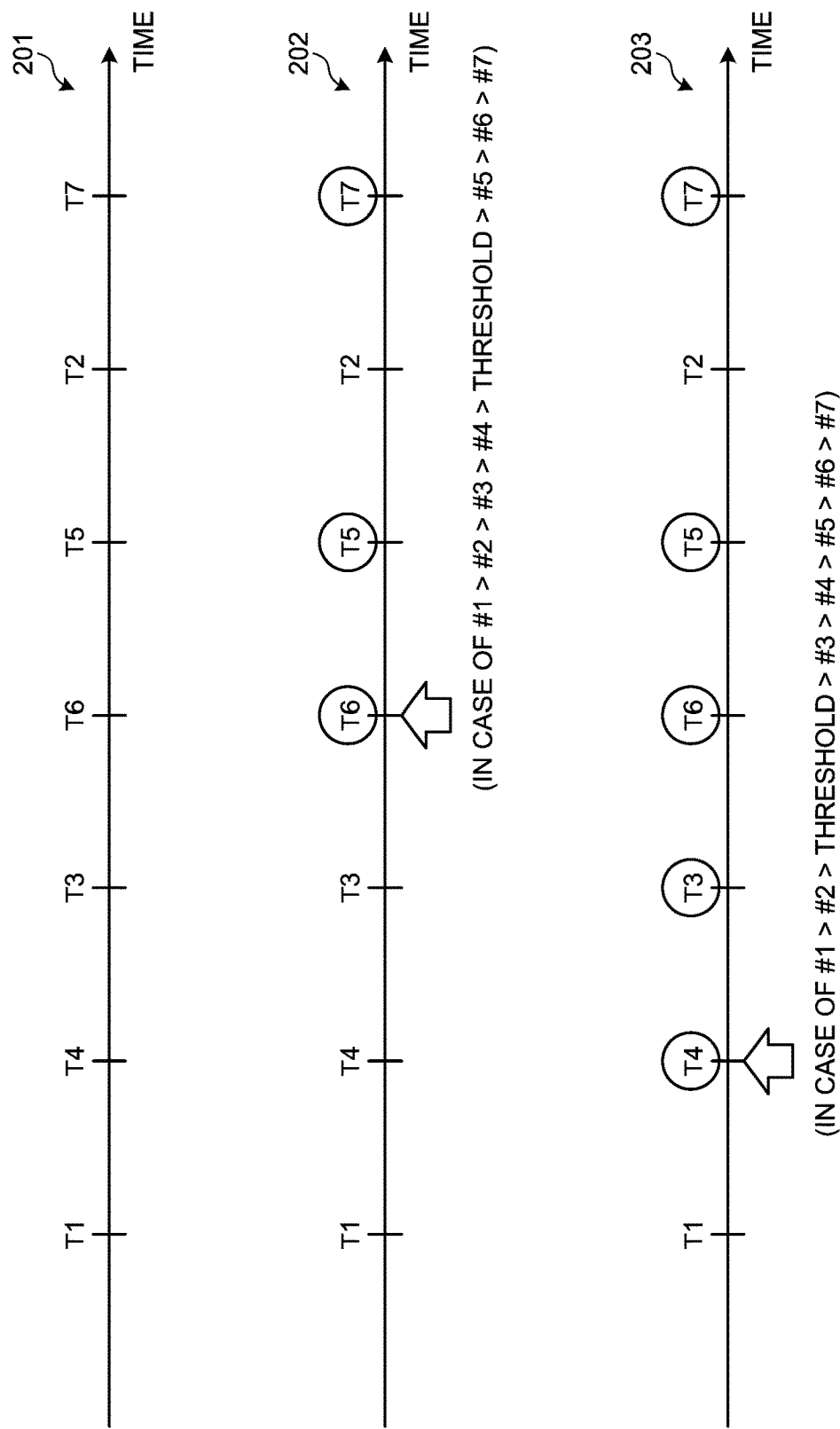
FIG. 10 is a diagram for explaining variation in connection timing based on difference in necessity of each BLE device.

Next, variation in the connection timing of the BLE device 2 to be connected based on difference in the necessity of each BLE device 2 during the data collection will be described with reference to FIG. 10. FIG. 10 is a diagram for explaining the variation in the connection timing based on the difference in the necessity of each BLE device.

In this example, there are BLE devices #1 to #7 as the data collection devices for explanation. In graph 201, the transverse axis indicates elapse of time and transmission and reception timings of the pieces of notification information of the respective BLE devices #1 to #7. The times T1 to T7 are the transmission and reception timings of the pieces of notification information of the BLE devices #1 to #7, respectively. The necessities of the BLE devices #1 to #7 are assumed to be #1 to #7, respectively. The necessities satisfy a relation of #1>#2>#3>#4>#5>#6>#7.

Graph 202 is a graph expressing selection of the connection timing when the threshold is higher than #5 and is lower than #4. In this case, #5 to #7 are lower than the threshold. In the graph 202, the times T5 to T7 enclosed with circles indicate the transmission and reception timings of the pieces of notification information of the BLE devices 2 the necessities of which are lower than the threshold. In this case, the connection controller 12 determines the time T6 as the closest transmission and reception timing from the times T5 and T6 to be the connection timing of the BLE device 2 to be connected. That is to say, the connection timing of the BLE device 2 to be connected in this case corresponds to the timing indicated by a thick arrow in the graph 202.

Graph 203 is a graph expressing selection of the connection timing when the threshold is higher than #3 and is lower than #2. In this case, #3 to #7 are lower than the threshold. In the graph 203, the times T3 to T7 enclosed with circles indicate the transmission and reception timings of the pieces of notification information of the BLE devices 2 the necessities of which are lower than the threshold. In this case, the connection controller 12 determines the time T4 as the closest transmission and reception timing among the times T3 to T6 to be the connection timing of the BLE device 2 to be connected. That is to say, the connection timing of the BLE device 2 to be connected in this case corresponds to the timing indicated by a thick arrow in the graph 203.

As described above, the more BLE devices 2 having low necessities in the data collection devices, the earlier the connection timing of the BLE device 2 to be connected. By contrast, the more BLE devices 2 having high necessities in the data collection devices, the later the connection timing of the BLE device 2 to be connected.

As described above, when the GW device in the embodiment detects the connection-type BLE device, it calculates the necessities of the respective data collection devices and executes the connection processing of the BLE device to be connected at the transmission and reception timing of the notification information of the BLE device the necessity of which is lower than the threshold. With this GW device, the connection-type BLE device can be connected and the notification information thereof can be acquired while reducing acquisition failure of the notification information with the high necessity that largely influences the processing of the application when the acquisition failure thereof occurs. Accordingly, service quality of service using the notification information can be improved.

Modifications

In the first embodiment, the difference between the average value and the abnormal value, the dispersion value, and the radio wave intensity are used for calculation of the necessity. The necessity calculation method is however not limited thereto as long as a method can provide a value enabling determination of whether the processing that the application executes is largely influenced when acquisition failure occurs. The connection controller 12 may calculate the necessity using the difference between the average value and the abnormal value and the dispersion value without using the radio wave intensity while focusing on the possibility of the abnormality occurring.

The connection controller 12 may use the frequency of the acquisition failure of a notification information instead of the radio wave intensity as information indicating the radio wave status for determining the possibility of occurrence of the acquisition failure. When the frequency of the acquisition failure is high, the possibility that the data acquisition unit 11 fails to acquire data is considered to be high and the number of times of reception of the notification information is preferably increased as much as possible.

In this case, when the data acquisition unit 11 has failed to acquire the notification information, it notifies the notification information management unit 14 of the acquisition failure of the notification information together with identification of the BLE device 2 as the target.

The notification information management unit 14 is notified of the acquisition failure of the notification information by the data acquisition unit 11. The notification information management unit 14 registers, in the notification information table 141, the acquisition failure of the notification information while making it correspond to the identification information of the BLE device 2 as the transmission source of the notification information that has been incapable of being acquired.

In the necessity calculation processing, the connection controller 12 calculates the numbers of times of the acquisition failure of the pieces of notification information of the respective BLE devices 2 as the data collection devices for a predetermined period of time from the notification information table 141 that the notification information management unit 14 has. The connection controller 12 sets, to the frequencies of the data acquisition failure, the numbers of times of the acquisition failure of the pieces of notification information of the respective BLE devices 2 as the data collection devices for the predetermined period of time. The frequency of the data acquisition failure is an example of the "communication state".

Subsequently, the connection controller 12 calculates the necessities of the respective BLE devices 21 using the differences between the average values and the abnormal values, the dispersion values of the pieces of notification information, the radio wave intensities, and the frequencies of the data acquisition failure for the following equation 2.

$$\text{Necessity} = \frac{1}{\text{difference}} \times \text{dispersion value} \times \frac{1}{\text{radio wave intensity}} \times \text{frequency} \quad (2)$$

The connection controller 12 can acquire the necessity enabling accurate determination of whether the processing of the application is largely influenced when the acquisition failure occurs by thus increasing the conditions for calculating the necessity.

In the above description, the BLE devices 2 to which the abnormal values are set are targets. The GW device 1 can however determine the connection timing on the basis of the necessities even when the abnormal values are not set to the BLE devices 2.

In this case, the connection controller 12 can determine the connection timing of the BLE device 2 to be connected by calculating the dispersion values of the pieces of notification information of the BLE devices 2 as the data collection devices and using, as the necessities, the dispersion values.

The magnitude of the dispersion value enables determination of whether variation in the notification information of the BLE device 2 having the dispersion value is recently large. That is to say, when the dispersion value is small, the variation in the notification information is small and it can therefore be predicted that subsequent notification information has a similar value. Accordingly, the influence on the processing that the application executes can be reduced even when the notification information is not acquired. The connection controller 12 can determine the connection timing using the dispersion values even when the abnormal values are not set to the BLE devices 2. Also in this case, the connection controller 12 may determine the connection timing while taking the radio wave status into consideration.

[b] Second Embodiment

Next, a second embodiment will be described. A GW device in the embodiment is different from the first embodiment in a point that when a connection-type BLE device is reconnected, the GW device calculates the necessity of the BLE device to be connected from previous information and determines connection timing using the calculated necessity. FIG. 1 illustrates an information collection system in the embodiment. FIG. 2 also illustrates the GW device in the embodiment. Hereinafter, determination of the connection timing in reconnection is mainly described and description of functions of respective parts that are the same as those in the first embodiment is omitted.

Description is made with reference to FIG. 2. The connection controller 12 receives an advertise message to detect the BLE device 20 to be connected. The connection controller 12 checks registration of identification information of the detected BLE device 20 and non-registration of information indicating that the BLE device 20 is in progress of data collection in the device table 161 in the device management unit 16. The connection controller 12 determines that the current connection with the BLE device 20 is reconnection.

Then, the connection controller 12 acquires pieces of notification information of the BLE device 20 to be connected for a constant period of time in the past from the notification information table 141 that the notification information management unit 14 has. The constant period of time in the past is, for example, a period of time from the time at which the notification information of the BLE device 20 to be connected was received last up to a time point in a specific period of time. The connection controller 12 calculates an average value and a dispersion value of the pieces of notification information of the BLE device 20 to be connected using the acquired pieces of notification information.

The connection controller 12 acquires the abnormal value of the BLE device 20 to be connected from the device table 161 that the device management unit 16 has. The connection controller 12 calculates the difference between the average value of the pieces of notification information of the BLE device 20 to be connected and the abnormal value thereof.

Furthermore, the connection controller 12 acquires the radio wave intensity when the notification information has been received last from the BLE device 20 to be connected as the radio wave intensity of the BLE device 20 to be connected from the radio wave intensity table 151 of the radio wave intensity management unit 15. That is to say, in this case, the radio wave intensity management unit 15 keeps pieces of information of the radio wave intensities of the disconnected connection-type BLE devices 2 including the BLE device 20.

The connection controller 12 calculates the necessity of the BLE device 20 to be connected using the difference between the average value and the abnormal value, the dispersion value, and the radio wave intensity for the equation 1. In this case, the connection controller 12 uses the necessity of the BLE device 20 to be connected as a threshold. The necessity of the BLE device 20 to be connected is an example of a "specific value".

Subsequently, the connection controller 12 extracts the BLE devices 21 as the data collection devices from the device table 161 that the device management unit 16 has. Then, the connection controller 12 calculates the necessities of the respective BLE devices 21.

Thereafter, the connection controller 12 determines whether the necessities of the respective BLE devices 21 are lower than the necessity of the BLE device 20 to be connected. The connection controller 12 acquires next transmission and reception timing of the notification information of the BLE device 21 the necessity of which is lower than the necessity of the BLE device 20 to be connected.

When there are the BLE devices 2 the necessities of which are lower than the necessity of the BLE device 20 to be connected, the connection controller 12 specifies the BLE device 21 with the closest next acquisition timing of the notification information among the BLE devices 21 the necessities of which are lower than the necessity of the BLE device 20. Then, the connection controller 12 determines that the connection processing with the BLE device 20 to be connected is executed at the next acquisition timing of the notification information of the specified BLE device 21.

When the necessities of the BLE devices 21 are equal to or higher than the necessity of the BLE device 20, the connection controller 12 specifies the BLE device 21 with the lowest necessity. Then, the connection controller 12 determines that the connection processing with the BLE device 20 to be connected is executed at the next acquisition timing of the notification information of the specified BLE device 21.

After that, when the next acquisition timing of the notification information of the specified BLE device 21 comes, the connection controller 12 executes the connection processing with the BLE device 20 to be connected. When connection with the BLE device 20 to be connected is established, the connection controller 12 notifies the data acquisition unit 11 of the establishment of the connection and notifies the device management unit 16 of the identification information of the BLE device 20 and the data acquisition cycle.

Figure 11:
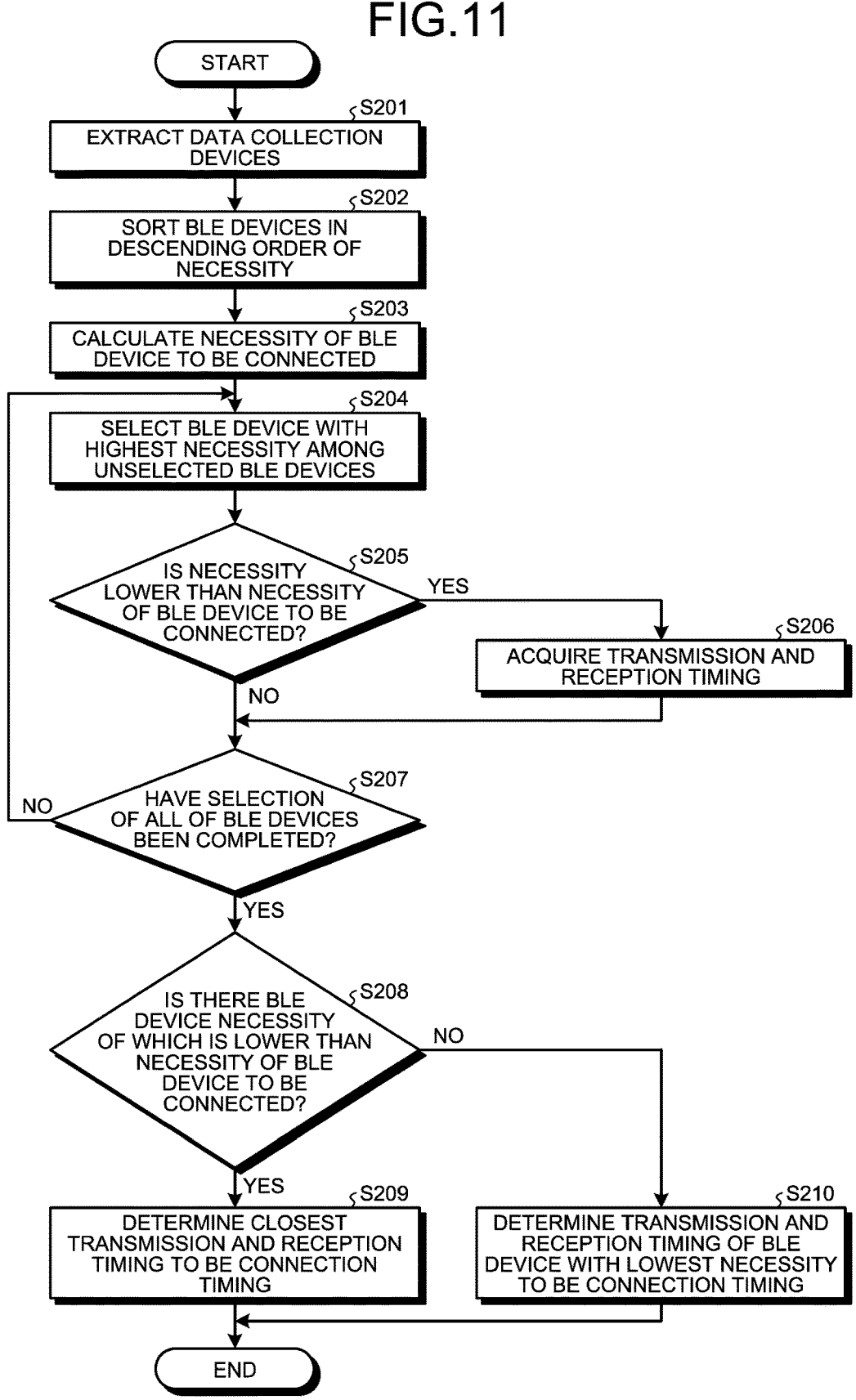
FIG. 11 is a flowchart of the connection timing determination processing in reconnection.

Next, flow of the connection timing determination processing by the GW device 1 in the embodiment will be described with reference to FIG. 11. FIG. 11 is a flowchart of the connection timing determination processing. In this case, the BLE device 2 to be connected is reconnected for description.

The connection controller 12 extracts the BLE devices 2 as the data collection devices from the device table 161 that the device management unit 16 has (step S201).

Then, the connection controller 12 sorts the extracted BLE devices 2 in the descending order of necessity using the necessity table 131 that the necessity management unit 13 has (step S202).

The connection controller 12 calculates the necessity of the BLE device 2 to be connected (step S203). In this example, the necessity of the BLE device 2 to be connected is calculated when the connection timing is determined. The calculation may however be performed at another timing and the connection controller 12 may calculate it, for example, when the necessities of the data collection devices are calculated.

The connection controller 12 selects the BLE devices 2 in the order from the top of the sorted BLE devices 2 to select the BLE device 2 having the highest necessity among the unselected BLE devices 2 (step S204).

Thereafter, the connection controller 12 determines whether the necessity of the selected BLE device 2 is lower than the necessity of the BLE device 2 to be connected (step S205). When the necessity of the selected BLE device 2 is equal to or higher than the necessity of the BLE device 2 to be connected (No at step S205), the connection controller 12 proceeds the process to step S207.

On the other hand, when the necessity of the selected BLE device 2 is lower than the necessity of the BLE device 2 to be connected (Yes at step S205), the connection controller 12 acquires next transmission and reception timing of the notification information of the selected BLE device 2 (step S206).

Thereafter, the connection controller 12 determines whether selection of all of the extracted BLE devices 2 has been completed (step S207). When a BLE device 2 that has not been selected is remaining (No at step S207), the connection controller 12 returns the process to step S204.

On the other hand, when selection of all of the extracted BLE devices 2 has been completed (Yes at step S207), the connection controller 12 determines whether there is a BLE device 2 the necessity of which is lower than the necessity of the BLE device 2 to be connected (step S208).

When there is a BLE device 2 the necessity of which is lower than the necessity of the BLE device 2 to be connected (Yes at step S208), the connection controller 12 determines the closest transmission and reception timing of the notification information to be the connection timing of the BLE device 2 to be connected (step S209).

On the other hand, when there is no BLE device 2 the necessity of which is lower than the necessity of the BLE device 20 (No at step S208), the connection controller 12 determines the transmission timing of the notification information of the BLE device 2 with the lowest necessity to be the connection timing of the BLE device 2 as the connection timing (step S210).

Figure 12:
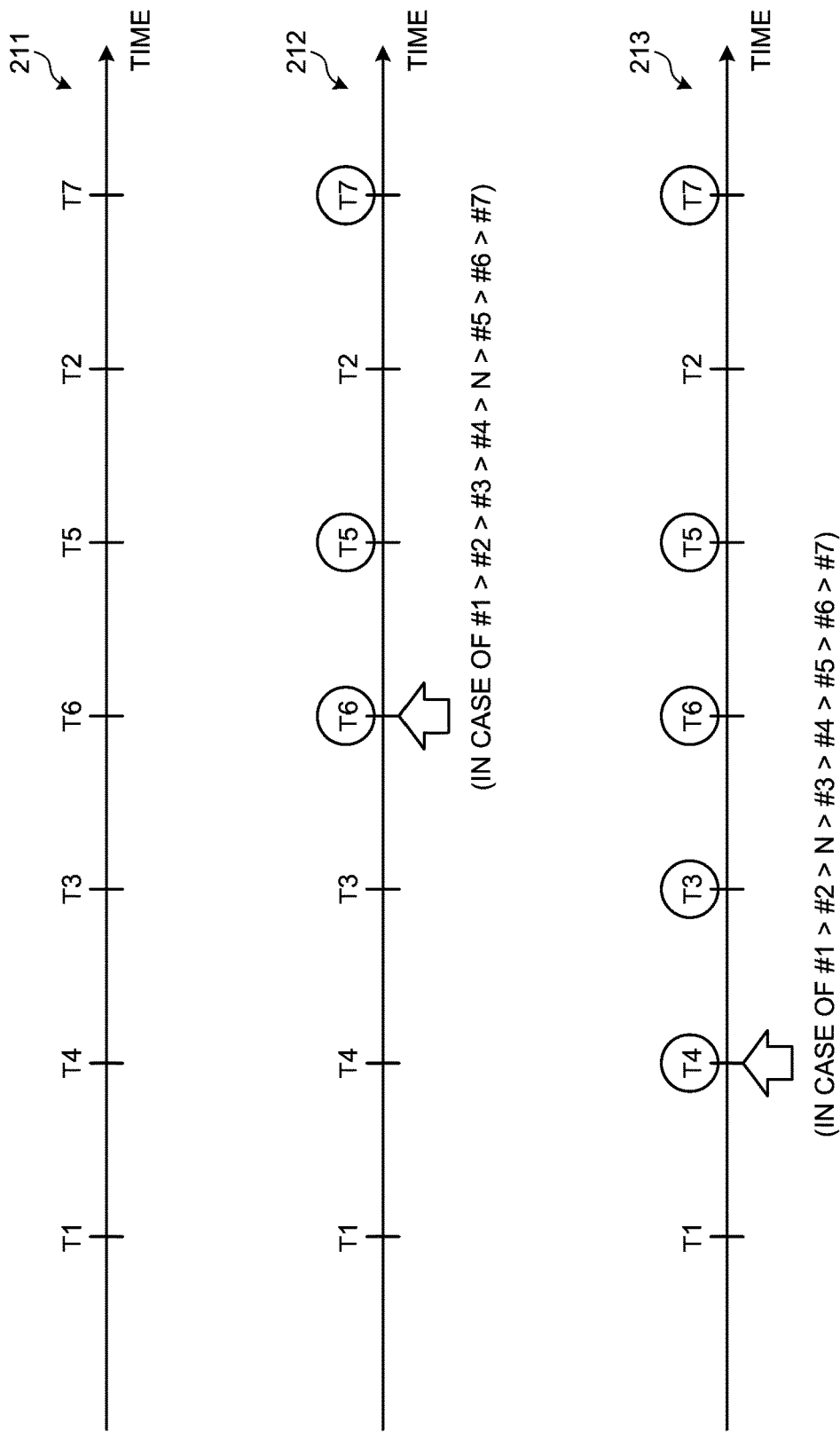
FIG. 12 is a diagram for explaining the variation in the connection timing based on the difference in the necessity of the BLE device to be connected in the reconnection.

Next, variation in the connection timing based on difference in the necessity of each BLE device 2 to be connected in the reconnection will be described with reference to FIG. 12. FIG. 12 is a diagram for explaining the variation in the connection timing based on the difference in the necessity of the BLE device to be connected in the reconnection.

In this example, there are the BLE devices #1 to #7 as the data collection devices for explanation. In graph 211, the transverse axis indicates elapse of time and transmission and reception timings of the pieces of notification information of the respective BLE devices #1 to #7. The times T1 to T7 are the transmission and reception timings of the pieces of notification information of the BLE devices #1 to #7, respectively. The necessities of the BLE devices #1 to #7 are assumed to be #1 to #7, respectively. The necessities satisfy a relation of #1>#2>#3>#4>#5>#6>#7. Furthermore, the necessity of the BLE device 2 to be connected is assumed to be N.

Graph 212 is a graph expressing selection of the connection timing when the necessity of the BLE device 2 to be connected is higher than #5 and is lower than #4. In this case, #5 to #7 are lower than N. In graph 212, the times T5 to T7 enclosed with circles indicate the transmission and reception timings of the pieces of notification information of the BLE devices 2 the necessities of which are lower than N. In this case, the connection controller 12 determines the time T6 as the closest transmission and reception timing from the times T5 and T6 to be the connection timing of the BLE device 2 to be connected. That is to say, the connection timing of the BLE device 2 to be connected in this case corresponds to the timing indicated by a thick arrow in the graph 212.

Graph 213 is a graph expressing selection of the connection timing when the necessity of the BLE device 2 to be connected is higher than #3 and is lower than #2. In this case, #3 to #7 are lower than N. In the graph 213, the times T3 to T7 enclosed with circles indicate the transmission and reception timings of the pieces of notification information of the BLE devices 2 the necessities of which are lower than N. In this case, the connection controller 12 determines the time T4 as the closest transmission and reception timing among the times T3 to T6 to be the connection timing of the BLE device 2 to be connected. That is to say, the connection timing of the BLE device 2 to be connected in this case corresponds to the timing indicated by a thick arrow in the graph 213.

As described above, in the reconnection, the higher the necessity of the BLE device 2 to be connected, the earlier the connection timing of the BLE device 2 as the BLE device 2 to be connected. By contrast, the lower the necessity of the BLE device 2 to be connected, the later the connection timing of the BLE device 2 to be connected.

As described above, the GW device in the embodiment determines the connection timing using the necessity of the BLE device to be connected as the threshold in the reconnection. With this GW device, the connection-type BLE device can be connected and the notification information thereof can be acquired while further reducing acquisition failure of the notification information with the high necessity that largely influences the processing of the application when the acquisition failure thereof occurs. Accordingly, service quality of service using the notification information can be further improved.

Hardware Configuration

Figure 13:
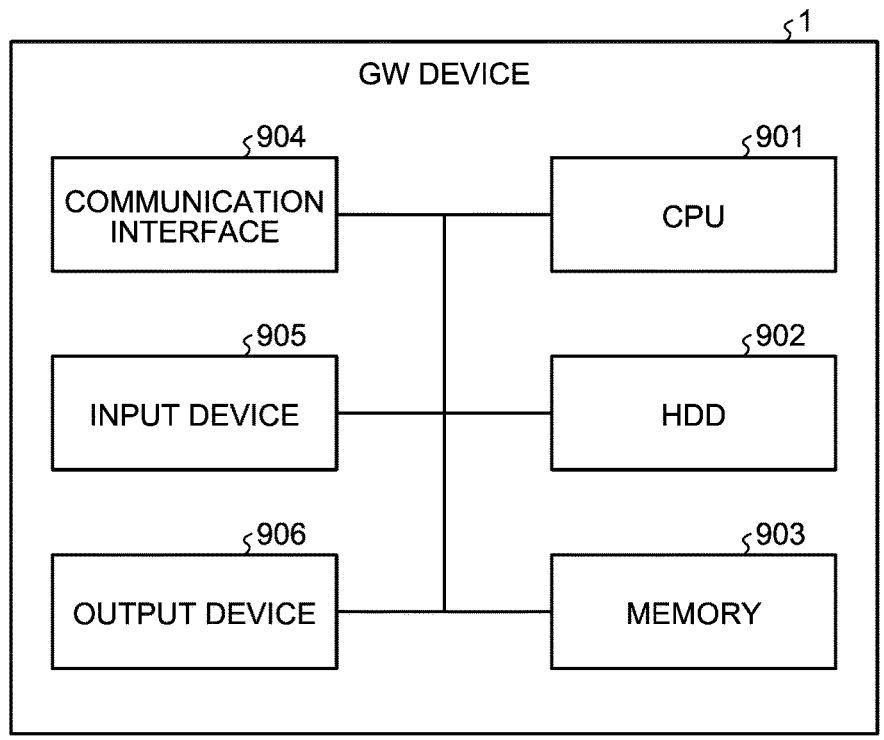
FIG. 13 is a hardware configuration diagram of the GW device.

FIG. 13 is a hardware configuration diagram of the GW device. The GW device 1 includes a central processing unit (CPU) 901, a hard disk drive (HDD) 902, a memory 903, a communication interface 904, an input device 905, and an output device 906.

The input device 905 is a keyboard, a mouse, or the like. The output device 906 is a monitor or the like. An operator inputs data to the GW device 1 using the input device 905 and the output device 906. The communication interface 904 is an interface for communicating with the center server 3 and the BLE devices 2 illustrated in FIG. 1.

The HDD 902 is an auxiliary storage device. The HDD 902 has functions of the storage devices that the notification information management unit 14, the radio wave intensity management unit 15, and the device management unit 16 illustrated in FIG. 2 have, for example. The HDD 902 stores therein, for example, the necessity table 131, the notification information table 141, the radio wave intensity table 151, and the device table 161. The HDD 902 stores therein various programs including a program for implementing the functions of the data acquisition unit 11, the connection controller 12, the necessity management unit 13, the notification information management unit 14, the radio wave intensity management unit 15, and the device management unit 16 illustrated in FIG. 2.

The CPU 901 is connected to the HDD 902, the memory 903, the communication interface 904, the input device 905, and the output device 906 via a bus. The CPU 901 reads various programs stored in the HDD 902 and develops and executes them onto the memory 903. The CPU 901 thereby implements the functions of the data acquisition unit 11, the connection controller 12, the necessity management unit 13, the notification information management unit 14, the radio wave intensity management unit 15, and the device management unit 16 illustrated in FIG. 2.

Figure 14:
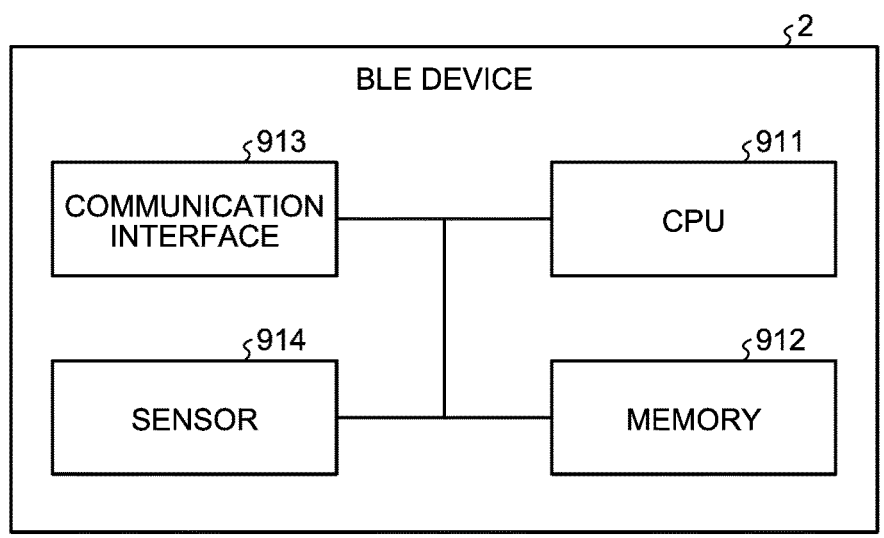
FIG. 14 is a hardware configuration diagram of each BLE device.

FIG. 14 is a hardware configuration diagram of each BLE device. The BLE device 2 includes a CPU 911, a memory 912, a communication interface 913, and a sensor 914, as illustrated in FIG. 14.

The communication interface 913 is an interface for communicating with the GW device 1 illustrated in FIG. 1. The sensor 914 is a device for acquiring predetermined information. The sensor 914 is, for example, a temperature measuring instrument, a humidity measuring instrument, or an illuminance measuring instrument.

The memory 912 stores therein various programs including a program for implementing the function of transmitting the information acquired by the sensor 914 to the GW device 1 through the communication interface 913.

The CPU 911 is connected to the memory 912, the communication interface 913, and the sensor 914 through a bus. The CPU 911 reads, develops, and executes the various programs from the memory 912 to implement the function of transmitting the information acquired by the sensor 914 to the GW device 1 through the communication interface 913.

One aspect of the present invention can improve service quality.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A communication control device comprising:
a processor configured to:
repeatedly acquire pieces of notification information for executing predetermined processing from a plurality of terminal devices;
detect a specific connectible terminal device,
determine whether connection of the specific terminal device is reconnection,
calculate, when the connection is not the reconnection, digitalized values of influences of the respective pieces of notification information acquired from the respective terminal devices on the predetermined processing on the basis of the pieces of notification information already acquired and select a terminal device on the basis of the calculated digitalized values of the influences,
calculate, when the connection is the reconnection, a specific digitalized value of the influence of the notification that is acquired from the specific terminal device on the predetermined processing on the basis of the notification information already acquired in a past connection period and select the terminal device using the specific value, and
stand by for acquisition of the notification information from the selected terminal device and establish connection with the specific terminal device.

2. The communication control device according to claim 1, wherein
the processor is configured to
acquire communication states with the respective terminal devices as transmission sources of the respective pieces of notification information in acquisition of the respective pieces of notification information, and
calculate the digitalized values of the influences on the basis of the pieces of notification information and the communication states already acquired.

3. The communication control device according to claim 1, wherein
the processor is configured to select the terminal device from which the notification information is acquired at closest timing among the terminal devices having the digitalized values of the influences that are equal to or lower than a threshold.

4. The communication control device according to claim 1, wherein
the processor is configured to acquire the notification information from the specific terminal device after the connection controller establishes the connection with the specific terminal device.

5. A communication control system comprising a communication control device, a plurality of terminal devices, and a processing execution device, wherein
each of the terminal devices includes:
an acquisition unit that repeatedly acquires notification information, and
a transmitter that transmits the notification information acquired by the acquisition unit to the communication control device,
the processing execution device executes predetermined processing using the pieces of notification information transmitted from the respective terminal devices, and
the communication control device includes:
a processor configured to:
acquire the pieces of notification information from the respective terminal devices, and
detect a specific connectible terminal device, determine whether connection of the specific terminal device is reconnection,
calculate, when the connection is not the reconnection, digitalized values of influences of the respective pieces of notification information acquired from the respective terminal devices on the predetermined processing on the basis of the pieces of notification information already acquired and select a terminal device on the basis of the calculated digitalized values of the influences,
calculate, when the connection is the reconnection, a specific digitalized value of the influence of the notification that is acquired from the specific terminal device on the predetermined processing on the basis of the notification information already acquired in a past connection period and select the terminal device using the specific value, and
stand by for acquisition of the notification information from the selected terminal device and establish connection with the specific terminal device.

6. A communication control method comprising:

acquiring pieces of notification information for executing predetermined processing from a plurality of terminal devices;

detecting a specific connectible terminal device;

calculating, when the connection is not the reconnection, digitalized values of influences of the respective pieces of notification information acquired from the respective terminal devices on the predetermined processing on the basis of the pieces of already acquired notification information;

selecting a terminal device on the basis of the calculated digitalized values of the influences;

calculate, when the connection is the reconnection, a specific digitalized value of the influence of the notification that is acquired from the specific terminal device on the predetermined processing on the basis of the notification information already acauired in a past connection period, selecting the terminal device using the specific value, standing by for acquisition of the notification information from the selected terminal device and establishing connection with the specific terminal device; and acquiring the pieces of notification information from the respective terminal devices and the specific terminal device.

* * * * *